Jan. 23, 1951  F. H. UMBERGER  2,538,812
PRESSURE FLUID MOTOR
Filed May 29, 1947  2 Sheets-Sheet 2
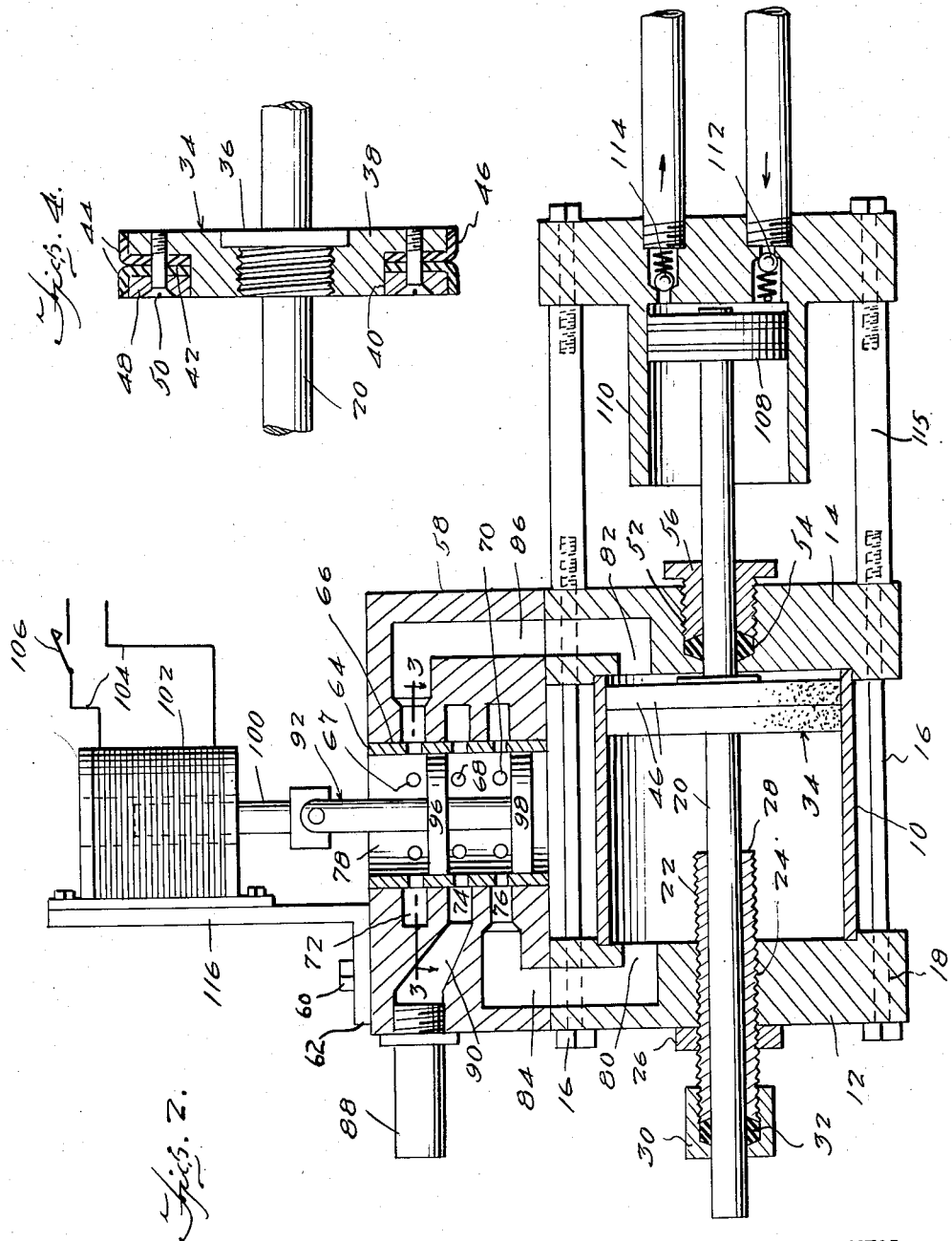
INVENTOR.
Franklin H. Umberger
BY
McMorrow, Berman and Davidson
ATTORNEYS Patented Jan. 23, 1951

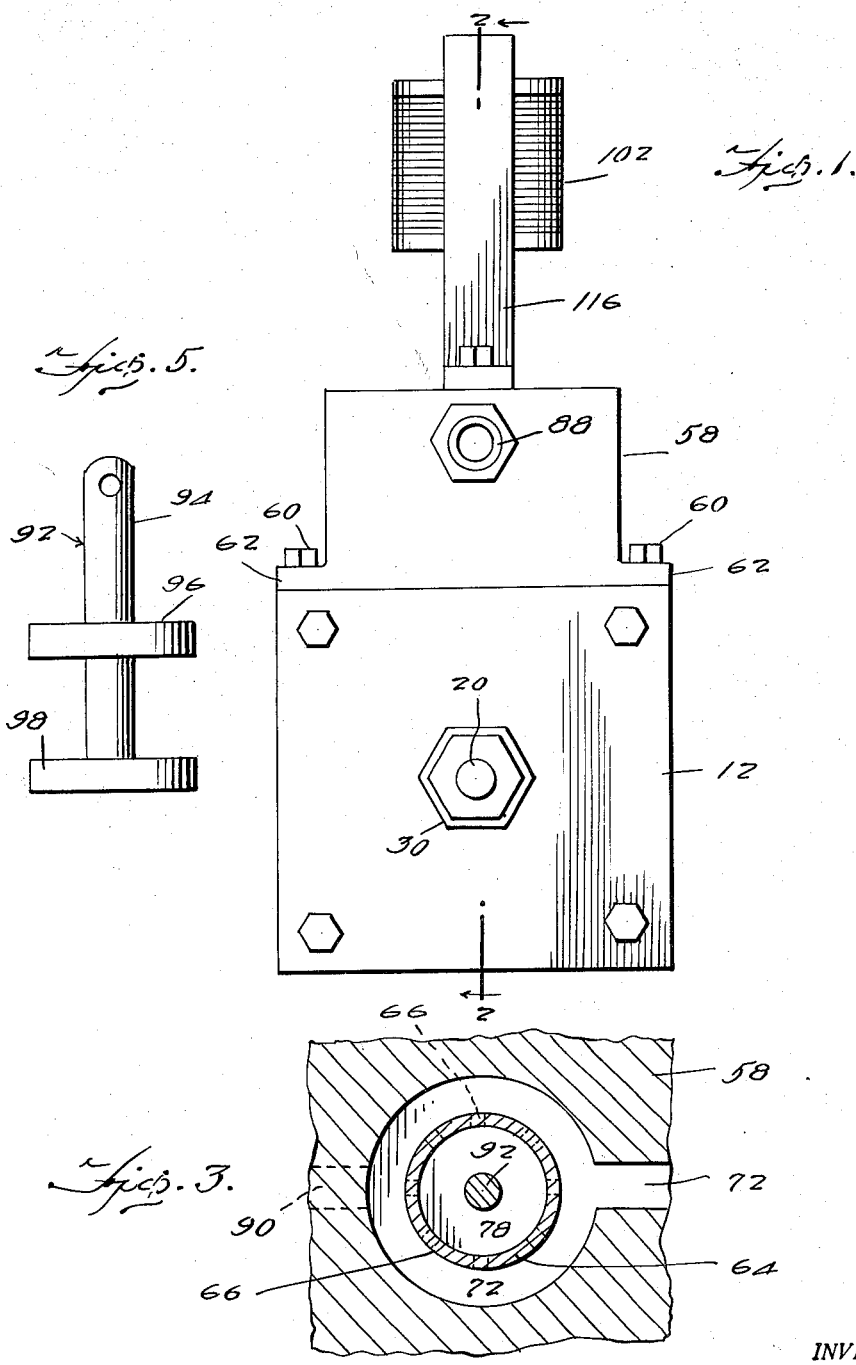

2,538,812

UNITED STATES PATENT OFFICE 2,538,812

PRESSURE FLUID MOTOR

Franklin H. Umberger, Newport, Oreg.

Application May 29, 1947, Serial No. 751,337

1 Claim. (Cl. 121—38)

This invention relates to fluid pumps.

An object of the invention is to provide a fluid pump actuated by means of a vacuum actuated motor for pumping measured quantities of fluid as needed.

Another object of the invention is to provide a pumping device which is driven by means of a reciprocating vacuum motor having valves for controlling its motion, and having electrically actuated solenoid means for regulating the operation of the valves.

A further object of the invention is to provide a vacuum operated electrically controlled liquid pump which is simple in design, inexpensive to manufacture, and which is effective for the purpose intended, with a minimum of maintenance and at low cost of operation.

Other objects and advantages of the invention will become apparent from the following description of a preferred embodiment thereof, as illustrated in the accompanying drawings, in which:

Figure 1 is a left end elevation of the device shown in Figure 2.

Figure 2 is a sectional elevation taken on line 2—2 of Figure 1.

Figure 3 is a fragmentary sectional plan view taken on line 3—3 of Figure 2.

Figure 4 is a sectional elevational view of the vacuum piston and shaft.

Figure 5 is a detail elevational view of the vacuum valve plunger.

In certain types of manufacturing it is necessary to deliver measured quantities of liquid to containers such as cans, bottles, jars, cartons, and the like, at intermittent and varied speeds. The present invention discloses a machine that will perform this function adequately and satisfactorily at a high rate of speed.

In order to understand the nature of the invention and the best means for carrying it out, reference may be had to the drawings, in which like numerals denote similar parts throughout the several views.

As shown, there is a vacuum motor cylinder 10 mounted between two cylinder heads 12 and 14, the assembly being secured together by means of through-bolts 16 extending through aligned apertures 18 formed in the cylinder heads.

A piston shaft 20 extends through the cylinder 10, being slidably supported in a guide bushing 22, which is threaded into a bore 24 formed in the cylinder head 12. A lock nut 26 is threaded onto the guide bushing 22 outside the cylinder head, so as to make adjustable the total length of the bushing which extends into the cylinder 10, its right end 28 thus constituting an abutment which may be termed a piston stop, as will be more fully explained below.

A packing gland nut 30, which is recessed to receive a gland packing 32 of any suitable material, is threaded upon the outer end of the guide bushing 22, as best seen in Figures 1 and 2, the shaft 20 being slidable horizontally therethrough. A vacuum piston 34 is reciprocally movable in the vacuum cylinder 10, being secured to the piston shaft 20 by means of nut 36, so as to move with the piston shaft.

The piston, as best seen in Figures 2 and 4, has a body portion 38 with an annular recess 40 formed therein to receive the webs 42 of two opposed piston cups 44 which are formed of flexible material, such as leather or the like, and having outer flanges 46 adapted to slidably engage against the inner wall surface of the cylinder 10 to form a tight seal therebetween. The cups 44 have their webs 42 retained in the recess 40 by means of an annular retaining ring 48 which is held in position by means of a plurality of retaining screws 50. If desired, the piston 34 may carry piston rings to effect a seal with the walls of the cylinder 10.

The piston shaft 20 also extends slidably through an aperture 52 formed in the other cylinder head 14, the aperture being enlarged to receive a gland packing 54 held in position by a nut 56.

A valve housing 58 is secured to the cylinder heads 12 and 14 by means of screws 60 extending through apertures formed in the flanges 62 in the valve housing, and into threaded bores formed in the cylinder heads 12 and 14. The valve housing 58 is so designed that it may be turned end-for-end. The pump to which it is connected may be powered with air pressure and maintain the same timing, and can be driven by steam or water. Consequently, the device constitutes a universal pump, adaptable to either vacuum or pressure for driving power. A valve sleeve 64 is disposed in a valve bore 66 formed in the valve housing 58, as best shown in Figures 2 and 3, the valve sleeve having three horizontal circular rows 67, 68, and 70, of sleeve ports formed therein. Three annular vertically-spaced grooves 72, 74, and 76 are formed in the valve housing bore 66, so as to encircle each of the rows of sleeve ports such as 67, each row of sleeve ports thus providing communication between its encircling groove such as 72, and the interior 78 of the valve sleeve 64.

Two ports 80 and 82, formed in the opposite cylinder heads 12 and 14, are connected respectively with the annular grooves 70 and 72 by means of ducts 84 and 86 respectively. A source of suction is connected by means of pipe 88, and through a duct 90 to the middle annular groove 74. A slide valve plunger 92 comprising a shaft 94 and two spaced collars or valve pistons 96 and 98 is slidable vertically in the valve sleeve 64, its valve pistons being spaced as shown in Figure 2 for a purpose that will be described hereinafter.

The upper end of the plunger 94 is secured to a solenoid plunger 100 which is movable upwards when its solenoid 102 is actuated by current through leads 104 from a source of power, not shown, as a switch 106 is closed, the opening of the switch 106 causing the valve plunger 94 to fall to its lower position. With the valve 94 in its lower position, shown in Figure 2, the suction from line 88 is applied through the annular grooves 74 and 76 and the duct 84 the left side of piston 34, drawing it to the left, which results in moving a working piston 108 also secured to shaft 20 to the left in a working cylinder 110, and drawing a quantity of fluid into the working cylinder 110 through an intake valve 112. There may be a plurality of such working pistons 108 and working cylinders 110, to comprise a multiple pump. For example, the shaft 20 extends to the left to operate another cylinder 110, so that each cycle will deliver a charge from a cylinder 110. For high speed, by hooking both intakes 112 together, the pump will charge one cylinder 110 while discharging the other. By connecting each pump to a separate container, the pump will deliver one or more different fluids with the same motor.

The solenoid 102 being actuated, the valve plunger 94 is elevated to its upper position, bringing the annular groove 74 into communication with the annular groove 72, and allowing suction to be applied to the opposite side of the piston 34 through duct 86, which moves the piston 34 to the right and exhausts the fluid from cylinder 110 through valve 114 as the piston 108 moves to the right. The cylinder 110 is spaced from the cylinder head 14 by the spacers 115.

It will be apparent that the length of the stroke of piston 34 is determined by the position of the abutment 28 on the inner end of the guide bushing 22, so that this may easily be adjusted as desired.

The solenoid 102 is supported upon a bracket 116 carried on the valve housing.

Although I have described a preferred embodiment of my invention in specific terms, it is to be understood that various changes may be made in size, shape, materials, and arrangement without departing from the spirit and scope of the invention as claimed.

What is claimed is:

In a pressure fluid motor comprising a cylinder, a piston reciprocable therein, a pair of cylinder heads disposed at the ends of the cylinder, a valve housing, a movable valve member in the housing, and a solenoid mounted above the valve housing with a movable core therein connected to the valve member, the features which include having the valve housing fixed upon the cylinder heads with the axis of the valve member and the solenoid disposed at right angles to the axis of the cylinder intermediate the ends of the latter, a stationary valve sleeve secured in said valve housing above said cylinder with open top and bottom and the movable valve member comprising a valve plunger and two valve pistons spaced apart on the valve plunger and slidable in the valve sleeve, having the cylinder heads individually provided with ports leading into the ends of the cylinder and fluid passages from the ports extending up into said valve housing, the valve sleeve having a group of ports disposed within the upper end thereof communicating with one of said fluid passages and a second group of ports within the lower end of the sleeve communicating with the other of said fluid passages, said valve housing having a further fluid passage therein extending to the intermediate portion of the valve sleeve and said valve sleeve having a third group of ports intermediate the first and second groups of ports communicating with the further fluid passage in said valve housing, and a pressure fluid supply pipe connected to said further fluid passage in said valve housing and leading to a pressure fluid source.

FRANKLIN H. UMBERGER.

REFERENCES CITED

The following references are of record in the file of this patent:

UNITED STATES PATENTS

| Number | Name | Date |
|---|---|---|
| 15,211 | Henry | June 24, 1856 |
| 1,863,448 | Landenberger | June 14, 1932 |
| 2,194,782 | Baade | Mar. 26, 1940 |
| 2,252,939 | McCoy | Aug. 19, 1941 |